United States Patent
Hairston

(10) Patent No.: US 7,295,934 B2
(45) Date of Patent: Nov. 13, 2007

(54) FLOW METER PERFORMANCE MONITORING SYSTEM

(75) Inventor: Ronald James Hairston, Cypress, TX (US)

(73) Assignee: Dresser, Inc., Addison, TX (US)

( * ) Notice: Subject to any disclaimer, the term of this patent is extended or adjusted under 35 U.S.C. 154(b) by 0 days.

(21) Appl. No.: 11/355,148

(22) Filed: Feb. 15, 2006

(65) Prior Publication Data

US 2007/0192046 A1    Aug. 16, 2007

(51) Int. Cl.
*G01L 13/00*    (2006.01)
(52) U.S. Cl. .............. 702/45; 702/47; 702/50; 702/140; 73/861.03; 73/861.42
(58) Field of Classification Search .......... 702/45, 702/47, 50, 140
See application file for complete search history.

(56) References Cited

U.S. PATENT DOCUMENTS

| | | | |
|---|---|---|---|
| 6,505,134 B2 * | 1/2003 | Poleshuk et al. | 702/100 |
| 6,654,697 B1 * | 11/2003 | Eryurek et al. | 702/47 |
| 2004/0249583 A1 * | 12/2004 | Eryurek et al. | 702/47 |
| 2006/0036404 A1 * | 2/2006 | Wiklund et al. | 702/183 |

OTHER PUBLICATIONS

"Testing Large-Capacity Rotary Gas Meters," by Bean, et al, Research Paper RP1741, vol. 37, Sep. 1946.

"Differential Testing of Rotary Gas Meters" by R. B. Crawford dated May 8, 1968 presented to the American Gas Association Distribution Conference.

"Rotary-Type Gas Displacement Meters," ANSI B109.3 approved Apr. 13, 2000.

"Differential Testing of ROOTS® Rotary Meters," RM-90, published Sep. 1998.

IM 5700.3 RPM Series Rotary Meter, American Meter Company, no date.

* cited by examiner

*Primary Examiner*—Hal Wachsman
(74) *Attorney, Agent, or Firm*—Fish & Richardson P.C.

(57) ABSTRACT

Apparatus and associated systems, methods and computer program products relate to monitoring the performance of an operating gas meter by automatic and substantially continuous differential pressure (dP) measurement. Measured dP may be compared against a baseline dP characteristic to determine if the measured dP exceeds a threshold value above a baseline dP characteristic. If the threshold is exceeded, then the system may generate a signal to request repair or replacement of the meter. After installation, some embodiments collect dP data over time and/or over a range of flow rates to automatically learn a baseline dP characteristic under installation conditions. A system may switch from a default baseline dP characteristic to a learned baseline dP characteristic. Some embodiments may further correct volume or flow rate signals for line pressure and/or temperature. Further embodiments provide a passive apparatus to protect a dP sensor against transients in line pressure and/or differential pressure.

16 Claims, 8 Drawing Sheets

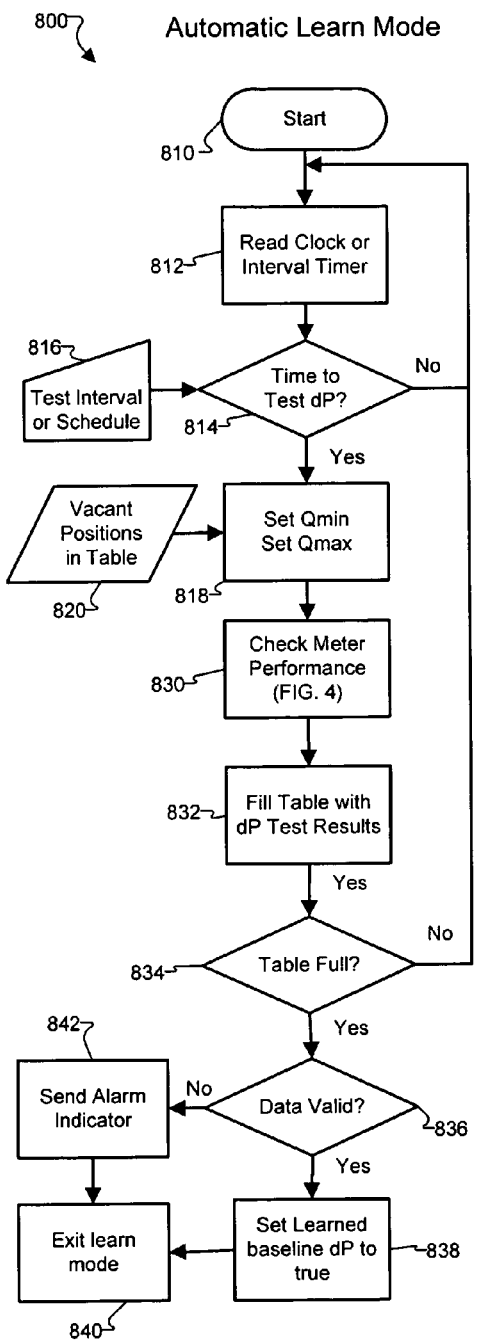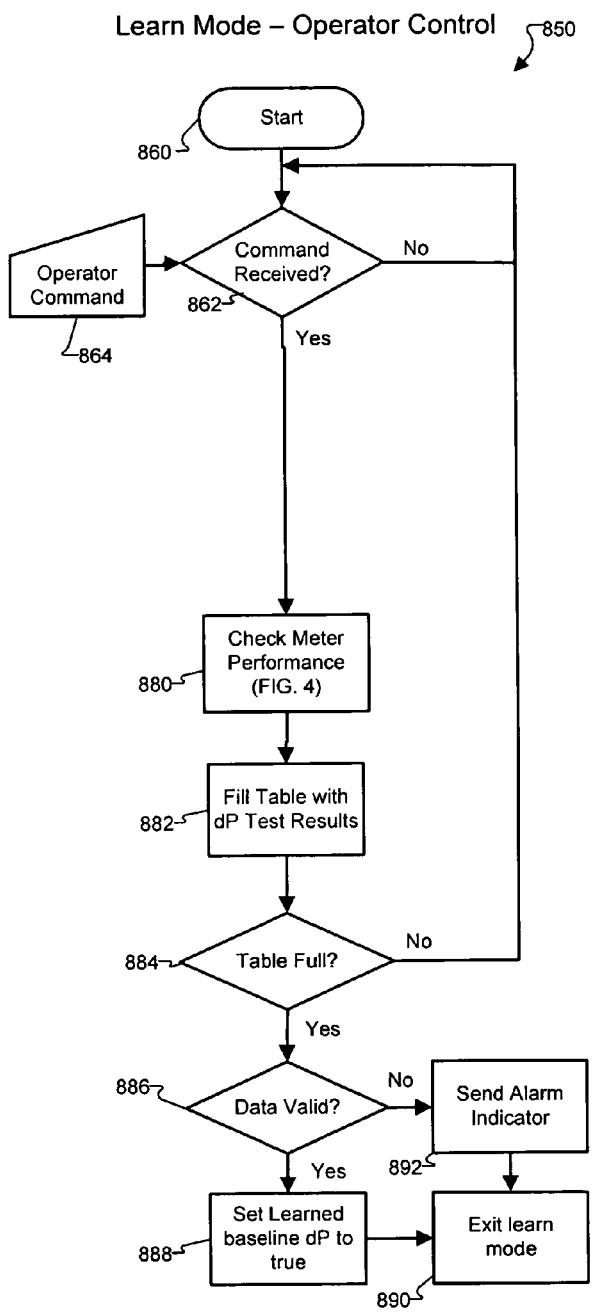
FIG. 8A
FIG. 8B

FLOW METER PERFORMANCE MONITORING SYSTEM

BACKGROUND

Technical Field

Various embodiments may relate generally to flow meters, and particular embodiments may relate to methods and systems for diagnostic testing of flow meters.

Fluids, such as natural gas, may be transported, distributed, and/or sold to customers through a system of transmission and distribution lines. For purposes such as billing and inventory control, for example, gas metering systems may be installed at various locations along these gas lines. Gas metering systems may measure the volume of gas that flows through a particular gas line. Some gas metering systems include a gas meter and an electronic or mechanical volume corrector.

One type of gas meter is a rotary gas meter. In some rotary gas meters, gas flowing through the meter causes a set of impellers to rotate within a cylinder. This type of meter is normally referred to as a rotary positive displacement meter. As the impellers turn, they measure a displaced volume of gas that is fixed and determined by the area between the impeller and cylinder. Each impeller rotation indicates that a certain volume of gas has flowed through the meter. This is normally referred to as "actual" volume as measured by the primary flow element that is in this case a rotary positive displacement meter. Buying and selling of natural gas typically requires that the actual volume be converted to "standard" volume to account for the contraction or expansion of gas due to varying gas pressure and gas temperature. In general, these effects may be described by Boyle's and Charles' Law. To convert actual volume to standard volume, some gas metering systems use an electronic volume corrector to correct actual volume measurement originating from the rotating impellers to account for temperature or pressure of the gas in the meter.

In general, the performance of a meter is unlikely to improve over time, as bearings in the gas meter become worn or contaminated, for example. As bearing friction increases, for example, volume measurement accuracy of a rotary flow type meter may decrease as gas leaks around the impellers. To monitor the meter performance, performance standards for a particular meter may be identified when the meter is installed, for example. Over the life of the meter, the meter's performance may be compared to the initial standard.

One performance standard involves differential pressure (dP) across the meter. dP measurements may be periodically taken to check for possible degradation in meter performance after installation. In some jurisdictions, additional dP tests may be performed at scheduled intervals (e.g., 3-5 years) by personnel who bring a portable manometer into the field to test the meter and compare the results to the baseline performance characteristic. Although dP testing does not measure meter accuracy, such testing may indicate the operational condition of the meter without using a large and heavy transfer prover. dP testing may be performed on meters in the field by an operator who applies a portable manometer to the meter. To protect the manometer from pressure transients when making a differential pressure measurement, the operator may open and close a number of valves in a sequence of steps.

A baseline dP performance characteristic may be made before installation, such as at a meter factory, in a meter shop environment, or in the field. In the field, a baseline dP performance characteristic may be generated during the installation/commissioning process by an installer who plots a point on a chart to indicate a measured differential pressure at a flow rate. The baseline dP performance characteristic may be recalled for comparison if future tests are performed.

SUMMARY

Apparatus and associated systems, methods and computer program products relate to monitoring the performance of an operating gas meter by automatic and substantially continuous differential pressure (dP) measurement. Measured dP may be compared against a predetermined or learned baseline dP characteristic to determine if the measured dP exceeds a threshold value above a baseline dP characteristic. If the threshold is exceeded, then the system may generate a signal to request repair or replacement of the meter. After installation, some embodiments collect dP data over time and/or over a range of flow rates to automatically learn a baseline dP characteristic under installation conditions. Other embodiments may learn a baseline dP characteristic for installation conditions while the flowing conditions are under manual operator control. A system may switch from a default baseline dP characteristic to a learned baseline dP characteristic. Some embodiments may adjust or further refine the baseline dP characteristic based on line pressure and/or temperature at the time dP of measurement. Some embodiments may further correct volume or flow rate signals for line pressure and/or temperature. Further embodiments provide a passive apparatus to protect a dP sensor against transients in line pressure and/or excess differential pressure across the dP sensor.

A baseline characteristic dP curve may include a set of expected dP values at various flow rates, line pressures, and/or temperatures. An exemplary system may use a baseline dP characteristic curve derived from a factory or meter shop, and then switch over to a learned baseline dP curve developed after installation using a self-characterization procedure. In various embodiments, the self-characterization procedure may be manually controlled using actively controlled flow rates, or automatically generated by making dP measurements over time on uncontrolled flow rates, for example.

In further embodiments, drift or DC offset of a dP transducer may be substantially removed using a procedure that operates upon detection of a substantially zero flow condition. Some embodiments may permit dP measurement and/or baseline dP self-characterization operations to be performed within time, temperature, and/or pressure limits after removing the offset from the dP transducer. For example, after a timer has expired, performance monitoring using dP measurements may be suspended until the DC offset reduction procedure can be performed again.

Some embodiments may provide one or more advantages. For example, embodiments may continuously and automatically monitor the performance of a meter to detect certain failure modes. This may provide earlier and/or less labor intensive identification of a meter accuracy problem, thereby reducing volume measurement errors and some financial transactions (e.g., billing) that rely on the accuracy of the meter over the meter's service life. Some embodiments may integrate measuring, calculating, and diagnostic capabilities with a gas meter, reducing or eliminating the need to transport and attach portable test equipment. Some embodiments may provide for internal recording of historical or other data, which data may replace paper charts and tables, and may be displayed or otherwise transmitted to communicate the condition of a meter. Some embodiments may automatically learn or self-characterize a performance characteristic during operation, without operator intervention, and without regard to a prevailing gas load. Some embodiments may automatically switch from a factor default performance characteristic to a learned performance characteristic learned in the field, thereby improving the accuracy with which the dP test may be used to detect performance problems.

Further advantages of various embodiments may include protection for a test measuring device from damage against pressure surges, flow constrictions, and/or plugged or leaking hoses or fittings, and without manipulation of valves to measure differential pressure. Embodiments may further automatically compensate for drifting measurement values due to time, temperature, and/or static line pressure. Still further, some embodiments may operate using electrical energy generated by flow-induced rotation of an element in the meter.

The details of one or more embodiments of the invention are set forth in the accompanying drawings and the description below. Other features, objects, and advantages of the invention will be apparent from the description and drawings, and from the claims.

DESCRIPTION OF DRAWINGS

FIG. 8A is a flow diagram of an exemplary method to automatically learn the baseline dP characteristic curve of FIG. 7.

FIG. 8B is a flow diagram of an exemplary method to learn the baseline dP characteristic curve of FIG. 7 under operator control.

Like reference symbols in the various drawings indicate like elements.

DETAILED DESCRIPTION OF ILLUSTRATIVE EMBODIMENTS

Figure 1:
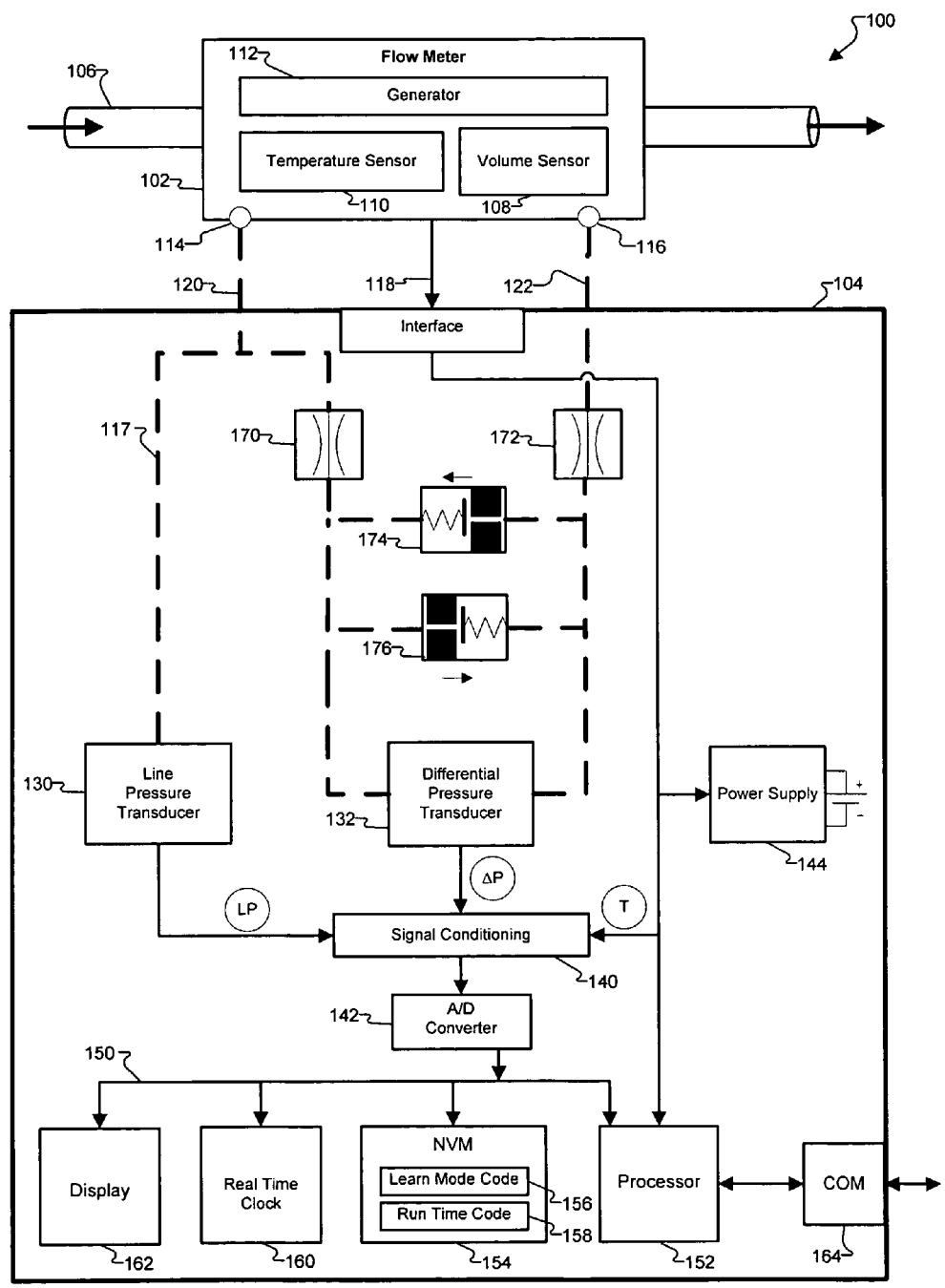
FIG. 1 shows an exemplary flow measurement system used to measure a differential pressure of a volume of gas flow in a gas distribution system.

FIG. 1 shows an exemplary embodiment of a flow measurement system 100 that can measure gas flow through a gas distribution or transmission line. The flow measurement system 100 includes a gas flow meter 102 and a processing system 104. When gas flows through the meter 102, the meter 102 communicates measured parameter information to the processing system 104 using electrical and pneumatic signals. The system 104 may process the signals to measure, among other things, a volume of gas flowing through the meter 102. As gas flows through the meter 102, the processing system 104 can measure a differential pressure (dP) across the meter 102. A measured dP value that is substantially elevated relative to a baseline dP characteristic value may indicate a performance problem, such as contamination or wear of the bearings, that might reduce the gas volume measurement accuracy of the system 100.

If the processing system 104 detects that the dP exceeds a threshold value above the baseline dP characteristic, then the system 104 may generate a signal to request repair or replacement of the meter 102. The threshold value may be based on a stored baseline dP characteristic curve, which may be a set of expected dP values at various line pressures and/or temperatures. In various operating modes, the processing system may use a factory default characteristic dP curve or a learned dP curve that may be developed in situ using a self-characterization procedure.

In this example, the meter 102 is installed to measure gas flowing through a gas line 106. The gas line 106 may transport gasses, such as natural gas, argon, butane, carbon monoxide, carbon dioxide, ethane, nitrogen, oxygen, propane, or air, for example. A similar embodiment using a flow element intended for the measurement of liquids may likewise measure dP across the meter to indicate the performance of the liquid meter. The meter 102 may include, for example, a rotary positive displacement type flow meter, a diaphragm positive displacement meter, or a turbine meter. Each of these meter types have moving measurement elements such as impellers, rotary pistons, diaphragms, or blades that may be subject to drag and a corresponding increase in dP across the element or elements.

The meter 102 includes a volume sensor 108, which may detect the rotation of impellers, for example. In response to gas flowing through the meter 102, the volume sensor 108 may generate an electrical (e.g., pulses) output signal, which the processing system 104 can process to facilitate gas volume measurement. In various embodiments, the volume sensor 108 may be found in the processing system 104 and detect the rotation of a shaft emanating from the meter 102 that indicates a volume of gas as measured by the meter impeller, for example.

Motion of a measurement element, impeller for example, may be supported within the housing of the meter 102 by bearings of one or more types, such as ball bearings, journal bearings, shaft bearings (i.e., axial and/or radial), and the like. Wear or contamination of these bearings may induce drag on the rotating measurement element and correspondingly increase the dP across the element.

The volume sensor 108 may include one or more Hall effect, inductive, optical, proximity, Wiegand, or magnetic switch sensors that generate a fixed number of pulses per revolution of a pair of impellers, for example. As another example, the volume sensor 108 may use any of the aforementioned sensor techniques to detect rotation of a turbine. As another example, the volume sensor 108 residing in the processing system 104 may use any of the aforementioned sensors techniques to detect rotation of a shaft emanating from the meter 102.

In various embodiments, the meter 102 may include additional elements. In this example, the meter 102 includes a temperature sensor 110 to sense the temperature of the gas flowing through the meter 102. The processing system 104 may use the temperature information from the temperature sensor 110 to convert actual volume to standard volume base on Charles' Law. The temperature information may also be used to normalize measured dP information before it is compared to factory default or self-characterized dP data stored in the processing system 104, for example. As another example, the measured temperature may direct the comparison of measured dP information to factory default or self-characterized dP data corresponding to that temperature, either directly or through interpolation of adjacent data points. In other embodiments, the meter 102 may include a line pressure transducer 130 and/or differential pressure transducer with adjoining restrictor elements (170, 172) and pressure limiting valves (174, 176). The functions of these are described later.

In this example, the meter 102 also includes a generator 112 to convert mechanical energy of the rotating impellers, for example, into electrical energy which may be temporarily stored (e.g., as charge on a battery or capacitor) and/or delivered to operating circuits in the system 100. Such a generator may be provided in some embodiments to supply electrical operating power to the processing system 104. Some embodiments may combine the generator 112 with the volume sensor 108 into a single functional element or assembly. Embodiments of the generator 112 are described in U.S. Pat. No. 6,886,414 to Gutierrez et al., entitled "Power Generating Meter," and filed on Apr. 21, 2003, the entire contents of which are incorporated herein by reference.

To communicate measured parameter information to the processing system 104 using electrical and pneumatic signals, the meter 102 further includes an inlet pressure portion 114 and outlet pressure port 116, and an interface for information link 118. Pneumatic lines 120, 122 (e.g., flexible pressure tube, pipe) may each connect at one end to inlet and output using any suitable pressure connection coupling, including, for example, soldered, quick disconnect, or appropriate plugs (e.g., PETE'S PLUG® Model #100 is commercially available from Peterson Equipment Company, Incorporated of McKinney, Tex. In some embodiments, pneumatic lines 120, 122 may not be required as the meter 104 may allow direct connection of the line pressure 130 and differential pressure 132 transducers.

The link 118 may carry analog and/or digital signals from sensors within meter 102. The means of carrying the signals may include wired (e.g., wire harness, cable) and/or wireless (radio frequency, optical fiber, infrared, Bluetooth, cellular) data communication and a suitable communication protocol (e.g., RS-232, proprietary or custom protocol). The data link 118 may provide uni-directional data flows from the meter 102 to the system 104, or communications may be bi-directional, including control commands from the system 104 to the meter 102.

In some embodiments, the meter 102 and the system 104 may be integrated in a single device, which may simplify or shorten the pneumatic lines and/or the data link 118. For example, the link 118 may be implemented as traces on a circuit board, or as an optical signal. In some embodiments, one or both pneumatic lines may be located within a package or a housing that contains the meter 102 and/or the processing system 104. In other embodiments, the system 104 may be separate and independently located from the meter. For example, an analog or digital wireless transceiver may be connected as an interface to the link 118. In various embodiments, the data link 118 and each of the pneumatic lines 120, 122 may include a plug on one, two, or neither end. The pneumatic lines 120, 122 may be secured and/or include a strain-relief mechanism within the housing (not shown) of the processing system 104.

The processing system 104 receives pneumatic signals via the pneumatic signal lines 120, 122. The processing system 104 processes the pneumatic signals to determine information about line pressure and differential pressure in the meter 102. In this example, the pneumatic signals are detected in the system 104 by a line pressure transducer 130 that measures an inlet line pressure at the meter 102 via the inlet pressure port 114, and by a differential pressure transducer 132 that measures the difference between the inlet pressure and the outlet pressures at the meter 102 via the outlet pressure port 116. The pneumatic line 120 provides substantially continuous and uninterrupted fluid communication from the inlet pressure port 114 to the line pressure (LP) transducer 130. The pneumatic line 120 also branches off to provide fluid communication from the inlet pressure port 114 to an input port of the differential pressure (dP) transducer 130. The pneumatic line 122 provides fluid communication from the outlet pressure port 116 to a second input port of the dP transducer 130.

The differential pressure transducer 132 may be, for example, a model PX1370 to 1 psid silicon pressure sensor commercially available from Omega Engineering, Inc. of Stamford, Conn. Other pressure transducers are also available from Honeywell International, Inc. of Morristown, N.J., and from Sensotech of Barleben, Germany.

The processing system 104 also receives data, power, and/or control signals for monitoring the meter and for measuring volume over the link 118. The volume sensor 108 output may include pulses that indicate gas volume measurement. The temperature sensor may output an analog or digital signal, for example. The generator 112 may output a regulated or unregulated voltage or current, which may be AC, DC (e.g., from rectified AC, or a DC generator). Such signals may also be high frequency, digital, analog (e.g., sinusoidal, square wave, pulses), or other encoded signal format, and may be in electrical, optical, or mechanical form suitable for conversion to stored measurement information as will next be described.

Volume, pressure, temperature, voltage, or current signals may be arranged for processing by signal conditioning circuitry 140 and an A/D converter 142. The signal conditioning circuitry 140 may include analog amplification and/or scaling means to modify the input signal so it may be more suitable for interface to the A/D converter 142. The signal conditioning circuitry 140 may also include common ancillary components necessary for proper on reliable operation such as limiting devices (e.g., clam circuits, resistor divider), protection devices (e.g., ESD, electrical fast transient, surge, lightning, reverse voltage), discrete circuit elements (e.g., diodes, filters, chokes, MOVs, tranzorbs), frequency response filters (e.g, noise reduction), signal separation (common-mode rejection), comparators (e.g., with or without hysteresis), DC or AC coupling, and/or integrators/differentiators, for example, Volume, pressure, and temperature signals, if in digital or pulse form, may bypass the signal conditioning circuitry 140 and the A/D converter 142 to directly interface to the processor 152. In some embodiments, the A/D converter 142 and/or signal conditioning circuitry 140 may be integrated with the processor 152 and one or more subsystems such as non-volatile memory 154, real-time clock 160, and communications 164, for example. In some embodiments, the signal conditioning circuitry 140 may include analog multiplexing that may permit one of multiple input signals to be digitally selected for processing by the A/D converter 142. After signal conditioning, if any, analog values of signals may be sampled and converted to a digital value representation by the A/D converter 142. The A/D converter may include sampling and digitization of one or more signals, such as with analog multiplexing and/or multiple A/D converters, for example.

The A/D converter 142 processes, either through the signal conditioning circuitry 140 or through a direct interface, a line pressure (LP) signal output by the line pressure transducer 130 and a dP signal output by the dP transducer 132. In this example, the A/D converter 142 also processes a temperature (T) signal received from the temperature sensor 110 over the link 118. In some embodiments the A/D converter 142 may also process, for example, an input signal from a gas calorimeter, gas chromatograph, densitometer, or other device that measures gas composition or characteristics used for converting measured volume to energy units (i.e., British Thermal Units, therms). The A/D converter 142 may also measure an output voltage from the generator 112, the supply voltage provided by a power supply 144, and/or a potentiometer setting (not shown) that may be provided as an input.

In embodiments, the processing system 104 may operate using electrical power generated by the generator 112 to supply power to the power supply 144. In other examples, the processing system 104 may operate using electrical power from stored energy (e.g., battery), an external power source, fuel cell, solar power, or a combination of these.

The A/D 142 outputs a serial or parallel output signal of data representing samples of the input signal(s) onto a digital bus 150. The bus 150 couples to a processor 152 and a non-volatile memory (NVM) 154. The processor 152 may include one or more processing devices that are operable to execute instructions (i.e., software, firmware) to perform operations. The NVM 154 may store program, control, data, metadata, and/or other information for access by the processor 152.

For example, the processor 152 may access instructions stored in the NVM 154, such as a learn mode code 156 module (discussed in detail with reference to FIGS. 8A-8B) and/or a run time code module 158 (discussed in detail with reference to FIGS. 3-6). The learn mode code module 156 may include instructions that, when executed by the processor 152, cause the processor 152 to perform operations to self-characterize a baseline dP curve. A self-characterized baseline dP curve may be generated for the rotary flow meter after installation, or in response to an operator's request. The run time code module 158 may include instructions that, when executed by the processor 152, cause the processor 152 to perform operations to check the differential pressure to evaluate the performance of the meter.

The processor 152 and NVM 154 may be integrated in a single device (e.g., ASIC), or implemented in several devices (e.g., chipset). In some exemplary embodiments, the processor 152 may include a microcontroller, microprocessor, DSP, and/or math co-processor, and the NVM may include ROM, EPROM, EEPROM, flash, a disc drive, or a combination of one or more of such devices. In some embodiments, some random access memory (RAM) (not shown) may be provided for volatile data storage (e.g., scratch pad memory). The processor may include or operate in conjunction with analog and/or digital components, including discrete and/or integrated devices, for example, state machines, drivers, transceivers, combinational logic, sequential logic, analog signal processing circuits, I/O circuits and devices, various support circuitry, and/or such components in combination.

In this example, the processor 152 is operably coupled to communicate with a real time clock (RTC) 160 and a display device 162 via the bus 150. The RTC 160 may provide date/time stamp information that may be stored and associated with data (e.g., dP, LP, and T) that is collected during operations, such as learning a baseline dP characteristic. The RTC 160 may be used to indicate timestamps on test data for the rotary flow meter 102. In addition, test and maintenance operations may be performed periodically according to a programmable schedule monitored and initiated by the RTC 160. The data/time stamp information may also be accessed when it is necessary to identify, for example, flowing gas conditions, weather conditions or other events in existence when data was collected. The time information RTC 160 may also be used to determine when to start and/or stop data collection for self-characterization of a base line dP curve (e.g., stop after 1 full year), and may also serve as a time base for functions such as the DC offset reduction function, which is described in further detail with reference to FIG. 3.

The processor 152 may send information to the display device 162 to be displayed to a user. The display device may include a display screen (e.g., LCD, LED), and/or other visual indicators. In other examples, the system 104 may also include audible indicators (e.g., speaker couple to voice synthesizer, annunciator, buzzer) and/or user input devices (e.g., touch screen, keypad, switches, buttons, dials, input pointing device).

In addition, the processor 152 is coupled in this example to a communication interface (COM) port 164. The COM port 164 may provide for one or two way communication with other devices. For example, the COM port 164 may provide for downloading historical flow and/or dP data, uploading default baseline dP characteristic information, configuration information, control commands, or revised or supplemental programming code from a programmer device. In another example, the COM port 164 may be used to link to a download terminal, laptop, or handheld computer, for example, to send collected measurement and/or maintenance request signals. For example, if the processing system 104 determines that the dP exceeds a threshold above a baseline dP characteristic, then that status information and/or request for maintenance may be communicated to a compatible processor-based device via the COM port 164.

The COM port 164 may include one or more physical interfaces and use any suitable protocol, such as wired (e.g., USB, Firewire, RS-232/422/485, CAN, 12C, SP1, Ethernet), optical (e.g., fiber-optic, infrared), and/or wireless (e.g., Bluetooth, CDMA, TDMA, EDGE, AM, FM, FSK, PSK, QAM, or other suitable transmission technique and/or protocol). In some embodiments, the COM port 164 may include a transmitter, receiver, power amplifier, antenna, and/or modem.

The pneumatic lines 120, 122 provide fluid communication of the pressure state of the gas entering and exiting the meter 102. As such, any pressure transients in the gas may be communicated to dP transducer 132. Pressure transients may be caused by sudden changes in demand, initial pressurization of the gas line 106, upstream or downstream pressure regulator operation, or lock-up of the impellers in the meter 102, for example.

The processing system 104 includes a protection system for the dP transducer 132. The protection system includes series restrictor elements 170, 172 in the fluid communication paths between each input port of the dP transducer 132 and the inlet pressure port 114 and outlet pressure port 116, respectively. The restrictor elements 170, 172 protect the dP transducer 132 against fast pressure transients of the line pressure. The restrictor elements may be, for example, a pin hole or sintered metal type flow restrictor. Snubber Fitting model B-4-SA-EG manufactured by Swagelok Company of Solon, Ohio limits flow to 0.05 liters per minute and is an example of restrictors designed to protect pressure gauge elements for pressure surges.

The protection system further includes differential pressure limit valves 174, 176 in this example, two opposing one-way values are shown. In other examples, the functions of the values 174, 176 may be integrated into a single two-way valve. Each of the values 174, 176 opens when a differential pressure across the valve reaches a limit. When the valve opens, pressure may be relieved sufficiently to protect the dP transducer 132 from being subjected to more than a rated differential pressure limit. The valves 174, 176 may be a valve similar to a stem valve on a car tire, for example. In other examples, the valves may be popper valves, and may be spring loaded. In one example, the valves 174 176 may be arranged to substantially limit the differential pressure across the dP transducer 132 to within about +/−1 psi. Check valve model MCV-1 manufactured by Clippard Instrument Laboratory, Inc. of Cincinnati, Ohio is an example of a commercially available poppet valve suitable for some embodiments.

The relationship between the flow characteristics of the restricting elements 170, 172 and that of the pressure limiting valves 174, 176 may influence the effectiveness of the protection system. For example, if the restricting element limits flow to 0.05 liters per minute, and if the pressure limiting valve opens at 0.5 psid and has a pressure drop of 0.02 psi at 0.05 liters per minute, then the maximum pressure the dP transducer will see is 0.52 psid. If the differential pressure under an external fault condition (i.e., pressure surge) results in a pressure at the inlet pressure port 114 of 105 psig and a pressure at the outlet pressure port 116 of 5 psig, then the following pressures will be observed: The dP between 114 and 116 will be 100 psid. With the pressure limiting valve 176 limiting the pressure across the dP transducer 132 to 0.52 psid, then the remainder of the 100 psid pressure will be equally split by the restricting elements (170, 172). Each restricting element 170, 172 will drop 49.74 psid. Using simple subtraction, for example, the pressure at the junction of restricting element 170 and dP transducer 132 drops from 105 psig to 55.26 psig. Using addition, the pressure at the junction of the restricting element 172 and dP transducer 132 rises from 5 psig to 54.74 psig. As a result, the differential pressure across the dP transducer 132 may be limited to 0.52 psid (55.26 psig minus 54.74 psig) protecting it from an extreme pressure surge.

In some embodiments, any of the restricting elements 170, 172 and/or the pressure limiting valves 174, 176 may also be integrated into the meter 102.

In various embodiments, the housing (not shown) for the processing system 104 may includes plastic, aluminum, composites, and/or steel, for example.

Figure 2:
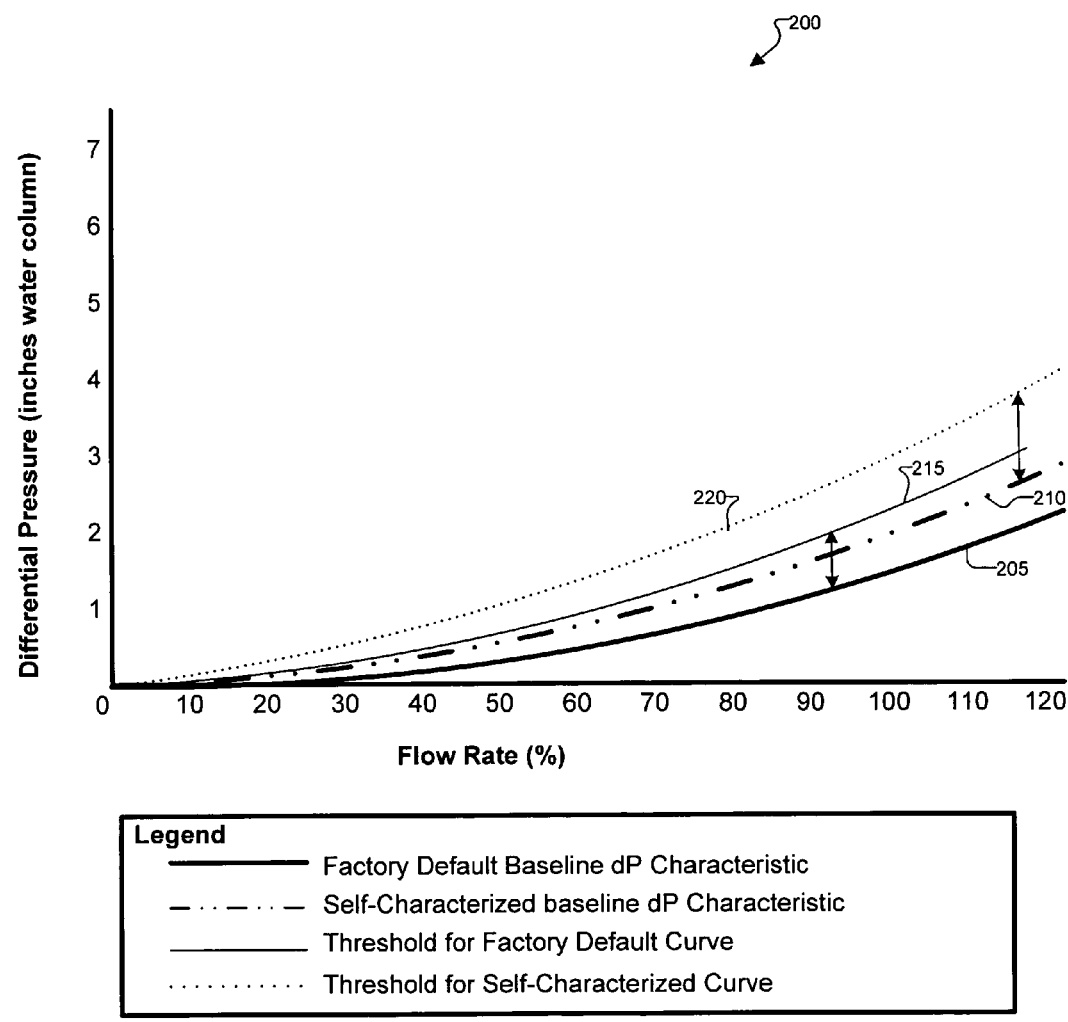
FIG. 2 is a plot of exemplary baseline dP characteristic curves.

The flow measurement system 100 may operate using baseline dP characteristic and threshold curves such as those illustrated in an exemplary plot 200 in FIG. 2. The curves may be used, for example, in operations to diagnose meter performance.

The plot 200 includes a factory default baseline dP characteristic curve 205 and a threshold curve 215 that is 50% above the baseline curve 205. The plot 200 also includes a self-characterized baseline characteristic curve 210 and a threshold curve 220 that is 50% above the baseline curve 210. In this example, the 50% threshold corresponds to a recommended specification in ANSI B109.3, Part IV, Section 4.3.2. In other examples, the threshold may be higher or lower, such as at least about {5%, 10%, 15%, 30%, 35%, . . . 200%}, and may be non-uniformly related to the characteristic curve over the range of flow rates. For example, some flow meters may use a function or polynomial rather than a simple percentage to determine an allowable threshold.

In some applications, there may be different actions taken at different thresholds. For example, in a system having three thresholds at 20%, 50%, and 70%, the processing system 104 may generate different messages depending on which threshold is exceeded. At the lower threshold, a warning light may be flashed. At a middle threshold, a status message may be made ready for download at a future maintenance check. Above a high threshold, the processing system 104 may transmit a wireless message or a message over a WAN requesting immediate service for the meter. In such messages, the processor 152 may include identifying information for the meter.

Messages sent or received via the COM port 164 may be in the form of packet-based messages, for example, or in the form of a data stream. In some embodiments, messages may be routed over a communication channel according to message header information that may be appended to a payload of data containing status, baseline characteristic, and/or collected data information, for example.

As will be described in further detail with reference to FIG. 5, embodiments of the processing system 104 may select either the default characteristic curve 205 or the self-characterized baseline characteristic curve 210. The selection is based on the operating mode and the availability of the self-characterized curve 210 (or the threshold curve 220). Unless and until the system 104 generates a self-characterization curve 210, performance of the meter 102 may be checked against the default threshold curve 215.

In some applications, the self-characterized curve 210 generated after installation in the field may be more accurate, reliable, and/or appropriate than the factory default curve 205 generated before the meter 102 was installed. A self-characterized baseline curve may also be preferable over a baseline dP curve that is characterized after installation at only one or a small number of flow rates.

A self-characterized (learned) baseline curve may be developed over a relatively long period of time (e.g., up to about 2 years or more) and over a wide range of flow rates, temperatures, and/or line pressure conditions.

Baseline dP characteristic curves 205, 210 and the threshold curves 215, 220 may be stored as data points, for example, in the NVM 154. In some embodiments, measured dP values may be adjusted to account for gas temperature and pressure effects. For example, the processor 152 may compute an adjustment according to predefined relationships stored in the NVM 154. In some embodiments, multiple baseline dP characteristic curves with data points may be established and stored in NVM 154 to account for the effects of gas temperature and gas pressure on dP readings. In such embodiments, the number of baseline curves may correspond to the range of variable gas temperatures and pressures. For example, data points representing twenty-five characteristic dP curves, each curve being associated with a different combination of five line temperatures and five line pressures, may be stored in the NVM 154.

Further refinement of characteristic dP may be accomplished by interpolating between adjacent dP curves based on measured gas temperature and/or pressure conditions present at substantially the same time that a dP reading is taken. In a like manner, dP readings that correspond to a flow rate percentage lying between stored data points residing in NVM 154 may be compared to a calculated baseline value using adjacent data point values.

Other methods may be used to essentially store baseline dP characteristic curve data 205, 210 such as the use of one or more algorithms that mathematically represent the baseline curve at any given flow rate percentage. In further embodiments, multiple algorithms, each mathematically representing one of a number of baseline dP characteristic curves for a specified gas temperature and/or pressure, may be used. In another embodiment, a single algorithm may mathematically represent baseline dP characteristic curves as a function of flow rate, temperature, and/or line pressure.

As will be described below, exemplary methods depicted as flow diagrams in FIGS. 3, 4, 5, 6, 8A and 8B include operations that may be performed generally by the processing system 104. The operations of the method 300 may be stored in the NVM 154, for example, as instructions in one or more subroutines, code modules, or objects that may be called for execution by the processor 152. Operations may also be supplemented or augmented by other processing and/or control elements that may be incorporated by the system 104. Some or all of the operations may be performed by one or more processors executing instructions tangibly embodied in a signal. The processing may be implemented using analog and/or digital hardware or techniques, either alone or in cooperation with one or more processors executing instructions.

Figure 3:
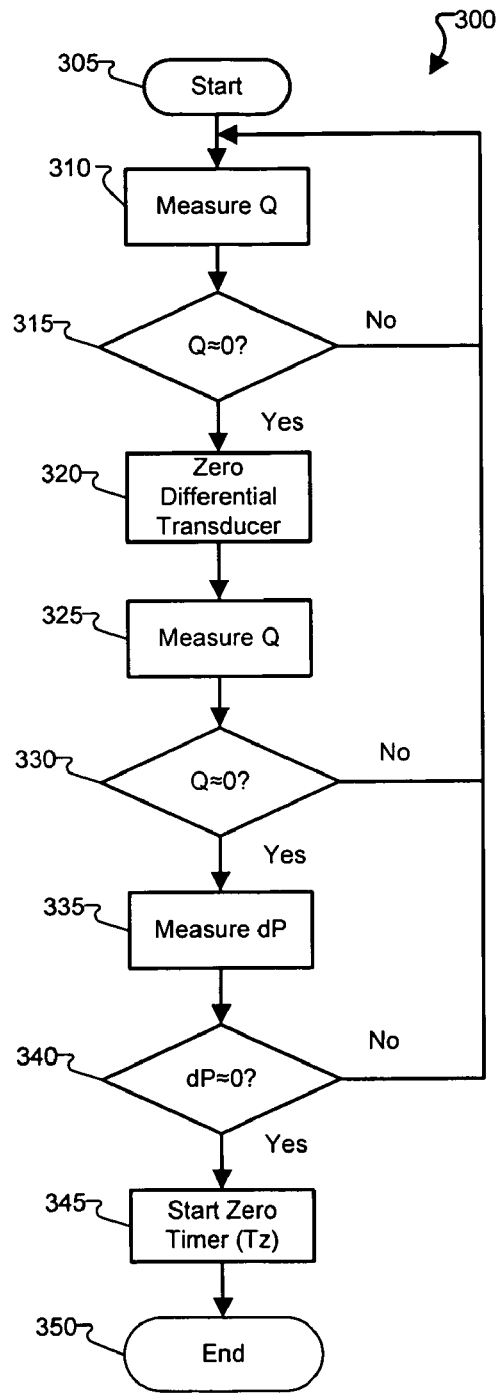
FIG. 3 is a flow diagram of an exemplary method to reduce offset of a dP transducer.

The flow measurement system 100 may be configured to perform an exemplary method 300 to zero the dP transducer 132 as illustrated in a flow diagram in FIG. 3. The method 300 includes operations that the processor 152 may perform to substantially reduce the DC offset of the differential pressure transducer 132 as described above. Offsets may be incurred, for example, due to conditions such as drift over time, temperature, supply voltage, and/or age of the transducer 132.

The method 300 begins at step 305 when the system 104 may be, for example, powering up, resetting, or when requested as needed when performing a dP test, an example of which will be described in further detail with reference to FIG. 5.

At step 310, the flow rate (Q) is measured. The flow rate Q is checked at step 315 to determine whether a substantially zero flow condition is present. If a substantially zero flow condition is not present, then step 310 is repeated.

If a substantially zero flow condition is present, then, in step 320, the dP transducer 132 is zeroed. An exemplary technique for zeroing the dP transducer 132 includes providing an analog bias signal that results in a substantially zero (or negligible) voltage on the A/D converter 142 for the dP measurement. Another exemplary technique includes storing the offset as a digital value in the NVM 154, and algebraically adding the stored offset value to subsequent measurements to compensate for the DC offset. Other techniques may be used to compensate for the DC offset. For example, temperature measurements may be used to correct for a temperature dependent offset by appropriate computation based on knowledge of the temperature dependent relationship.

After zeroing the dP transducer 132, the flow rate (Q) is again measured at step 325. The flow rate Q is checked at step 330 to determine whether a substantially zero flow condition is still present. If a substantially zero flow condition is not present, which may indicate absence of a steady zero flow condition, then step 310 is repeated.

If a substantially zero flow condition is still present, then, in step 335, the dP is measured. The measured dP is checked at step 340 to determine whether the zeroed transducer reading is substantially zero. If the zeroed transducer reading is not substantially zero, which may indicate absence of a steady zero flow or poor measurement repeatability, then step 310 is repeated. Poor measurement repeatability may occur, for example, due to electrical noise phenomenon, pressure transients, or ongoing pressure balancing as gas bleeds through restricting elements 170, 172. In other embodiments, flow rate (Q) and dP may be checked multiple times, five times each for example, to ensure that the dP transducer 132 is reliably zeroed during steady state conditions.

In some embodiments, stable conditions may be determined with greater confidence, for example, by measuring additional flow rates and checking that the additional measurements are within a threshold range of the other values, or that the statistical variance ($\sigma$) of all measurements is within a predetermined limit.

If the zeroed transducer reading is substantially zero, then a "zero timer" T(z) is started at step 345, and the method 300 ends at step 350.

In one embodiment, a timer is loaded with a predetermined value that causes that timer T(z) to expire and interrupt or generate a call to the processor 152 after a predetermined time. In another embodiment, the processor 152 periodically checks the RTC 160 to determine whether the predetermined time has passed. Until T(z) expires, the zeroing of the transducer 132 is considered to be valid. After T(z) expires, the transducer 132 is considered to be in need of a re-zeroing by performing the method of FIG. 3. The time for T(z) may be on the order of minutes, hours, days, or weeks, for example.

In some embodiments, the re-zeroing method of FIG. 3 may be re-initiated in response to a detected change in temperature, pressure, supply voltage, or other parameter that can introduce significant DC offset. For example, every change of 10 degrees Celsius from the temperature present during the most recent re-zeroing process may trigger a new re-zeroing, whether or not the T(z) has expired. Accordingly, temperature, line pressure, and time information may be stored in association with the method of FIG. 3.

Figure 4:
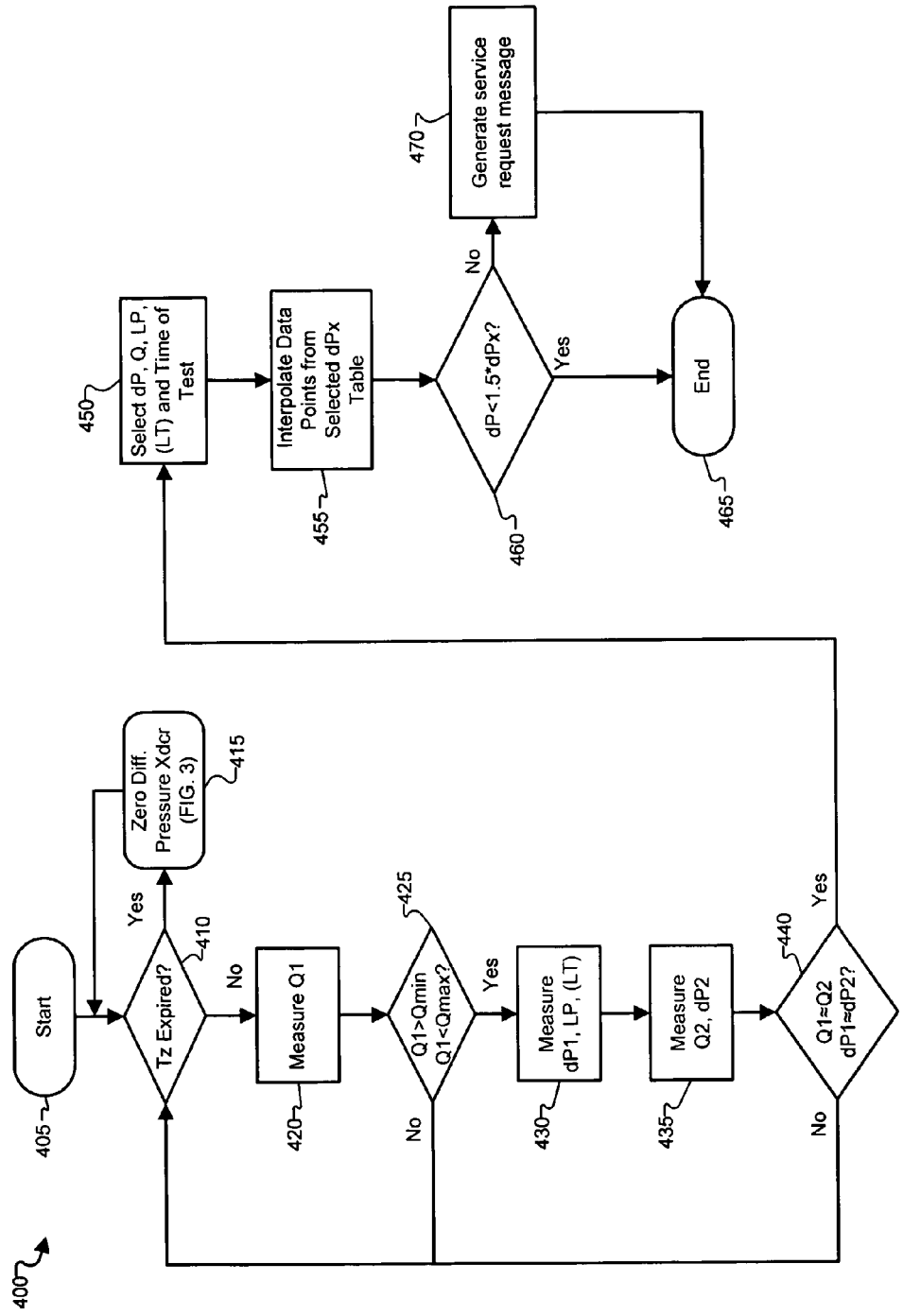
FIG. 4 is a flow diagram of an exemplary meter performance test method.

The flow measurement system 100 may be configured to perform an exemplary method 400 to check the performance of the meter 102 as illustrated in a flow diagram in FIG. 4. The method 400 includes operations that the processor 152 may perform to measure differential pressure, flow rate, line pressure, line temperature, and to compare the measurement to a selected baseline dP characteristic. If the measured dP exceeds the baseline dP characteristic by more than a threshold (i.e., 50% in this example), then the system 104 generates a message requesting service.

The method 400 begins at step 405 when a meter performance check is requested, for example, to continuously monitor performance of the meter 102 or to generate self-characterized curves, examples of which will be described in further detail with reference to FIGS. 6, 8A, and 8B.

At step 410, the zero timer T(z), which was started at step 345, is checked to determine if it expired. If T(z) is expired, then, at step 415, the method 300 is repeated, and then step 410 is repeated. As described elsewhere herein, other examples may repeat the method 300 based on other DC offset-related criteria, such as changes in temperature or pressure, for example. If T(z) is not expired, then the processor 152 makes a first measurement of flow rate (Q1) at step 420. The measurement Q1 may be corrected for temperature and/or pressure, for example.

In this example, the system 104 determines whether the flow rate is stable and within a valid range. At step 425, a first flow rate measurement (Q1) is evaluated to determine if it is between minimum and maximum valid flow rate thresholds (Qmin, Qmax). The valid range of flow rates may be, for example, above about 5%, 10%, 20%, or 30%, and below about 90%, 100%, 110%, 120%, 130%, 140%, or 150% of the rated flow rate capacity of the meter 102. If Q1 is not within a range defined by Qmin and Qmax, then step 410 is repeated.

If Q1 is within a range defined by Qmin and Qmax, then measurements are made of differential pressure (dP1) and line pressure (LP). In this example, line temperature (LT) is also measured. In other examples, the line pressure may be set to a fixed value rather than a measured value. Next, at step 435, a second measurement of flow rate (Q2) and differential pressure (dP2) are made. To check for stability, a check is made at step 440 to determine whether Q1 is approximately equal to Q2, and whether dP1 is approximately equal to dP2. If both flow rate and dP are not substantially equal, then a transient may have occurred, so step 410 is repeated. In some embodiments, stable conditions may be determined with greater confidence, for example, by measuring additional flow rate and differential pressure combinations (e.g., Q3, dP3) and checking that the additional measurements are within a threshold range of the other values, or that the statistical variance ($\sigma$) of all measurements is within a predetermined limit.

If the flow rate and differential pressure measurements indicate stable conditions, then values for measured dP, Q, LP, and a time stamp are selected at step 450 for comparison to a selected baseline dP characteristic. In this example, a value for LT is also selected. The selection may be, for example, the first measurement (e.g., dp1, Q1), the most recent measurement (e.g., dp2, Q2), or an average (mean) of the measured values. The time stamp information may be determined using the RTC 160.

At step 455, the measurement data selected in step 450 are used to interpolate between data points in a baseline characteristic table associated with the selected baseline dP characteristic curve. An exemplary method for selecting the baseline dP characteristic curve is described with reference to FIG. 5. In some embodiments, interpolation may involve linear or polynomial curve fitting to estimate a baseline differential pressure value (dPx) at the selected flow rate (Q) and the selected line pressure (LP). In some embodiments, a baseline dP characteristic curve may be represented by one or more polynomial equations rather by the recording of a series of data points.

At step 460, the selected differential pressure (dP) from the measured data is compared to the threshold for the baseline characteristic (e.g., 1.5*dPx) at the selected Q and LP. If dP is less than the threshold of 1.5*dPx, for example, then the meter performance is considered acceptable and the method ends at step 465. In other examples, the threshold in step 460 may be different than the 150% of dPx. For example, the threshold may be about 110%, 120%, 130%, 140%, 160%, 170%, 180%, 190%, or at least about 200%. Higher thresholds may be set up to at least about 500%.

If dP is not less than the threshold of 1.5*dPx, then the system 104 generates a service request message at step 470. For example, an alarm indicator may be sent to the display 162, or an electronic message may be sent as a packet over the Internet via the COM port 164. The method ends at step 465. In other embodiments, multiple threshold levels may be provided, and different service request messages may be sent based upon which thresholds are exceeded.

Figure 5:
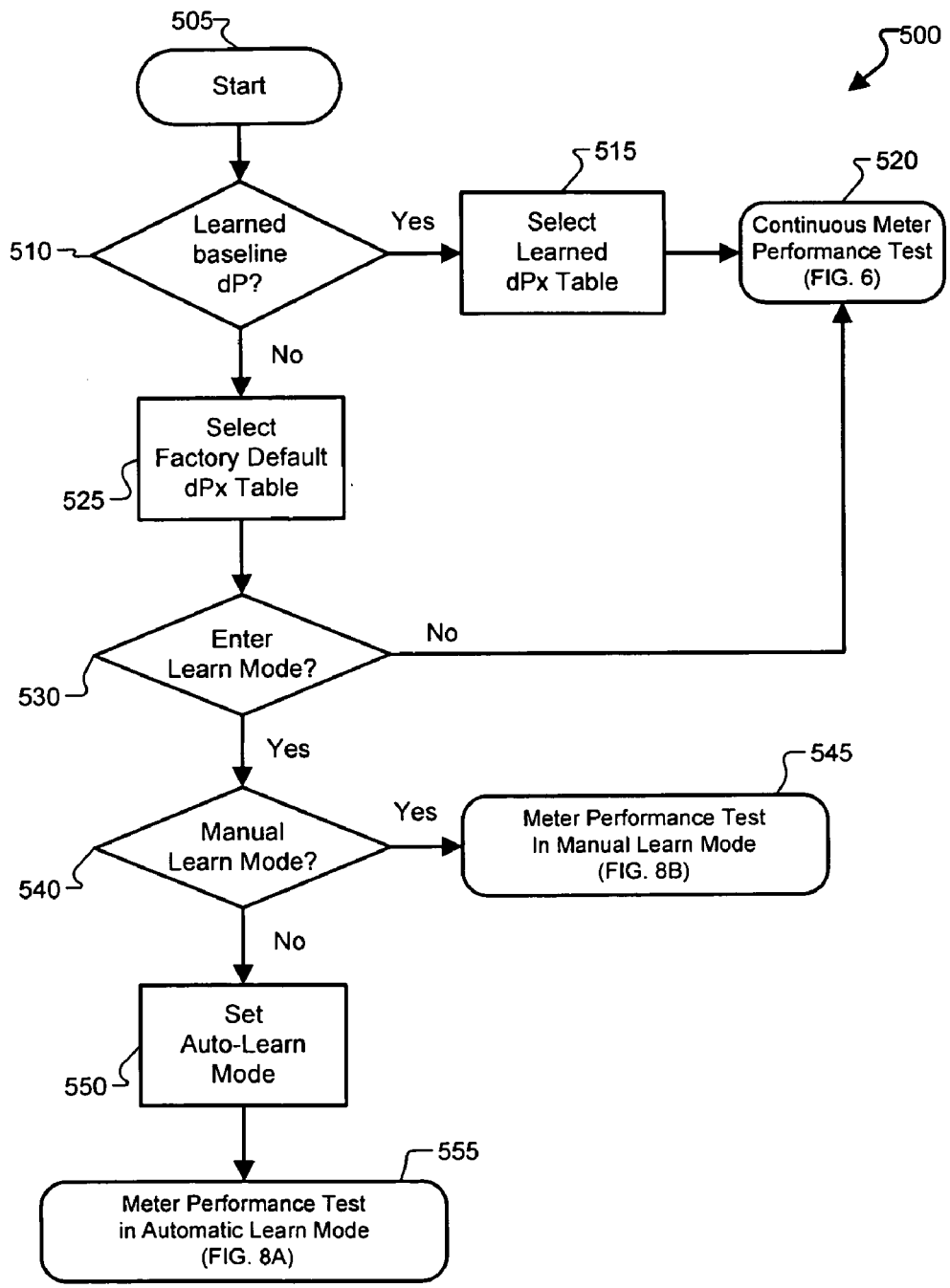
FIG. 5 is a flow diagram of an exemplary operating mode and baseline dP characteristic selection method.

The flow measurement system 100 may be configured to perform an exemplary method 500 to select an operating mode and a baseline dP characteristic as illustrated in a flow diagram in FIG. 5.

The method 500 begins at step 505, for example, initializing a program to continuously monitor performance of the meter 102 or to generate self-characterized curves, examples of which will be described in further detail with reference to FIGS. 6, 8A, and 8B.

At step 510, the processor determines whether a learned baseline dP characteristic is available. The table may be stored in the NVM 154, for example. In other examples, the table may be stored on a flash card, such as on a PCMCIA card slot. In general, a learned baseline dP characteristic that is developed after installation in the field may be preferred over a factory default baseline dP characteristic. If a learned dP characteristic is available, then a table of data points, or a polynomial representing the same, associated with the learned baseline dP characteristic is selected at step 515, and meter performance testing may begin using the selected table at step 520. An example of the meter performance testing that may be performed is described with reference to FIG. 6.

If a learned dP characteristic is not available, then a table of data points associated with the factory default baseline dP characteristic is selected at step 525. The table may be stored in NVM 154. At step 530, a decision is made whether to enter learn mode. This decision may be made in response to user input, system configuration, or information received via the COM port 164, for example. If learn mode is not entered, then step 520 is performed. In some embodiments, the operating mode at step 520 may involve continuously monitoring performing of the meter 102, for example, according to the method described with reference to FIG. 6. In this opening mode, operations may not typically be performed for the purpose of learning a new baseline dP characteristic curve.

If learn mode is entered, then a decision is made whether to enter manual learn mode at step 540. This decision may be made in response to user input, system configuration, or information received via the COM port 164, for example. If manual learn mode is entered, then a learn mode method under operator control is performed at step 545. An example of a learn mode method under operator control is described with reference to FIG. 8B.

If manual learn mode is not entered, then the system 104 is set to an automatic learn mode at step 550. An automatic learn mode method is performed at step 555. An example of an automatic learn mode method is described with reference to FIG. 8A.

Figure 6:
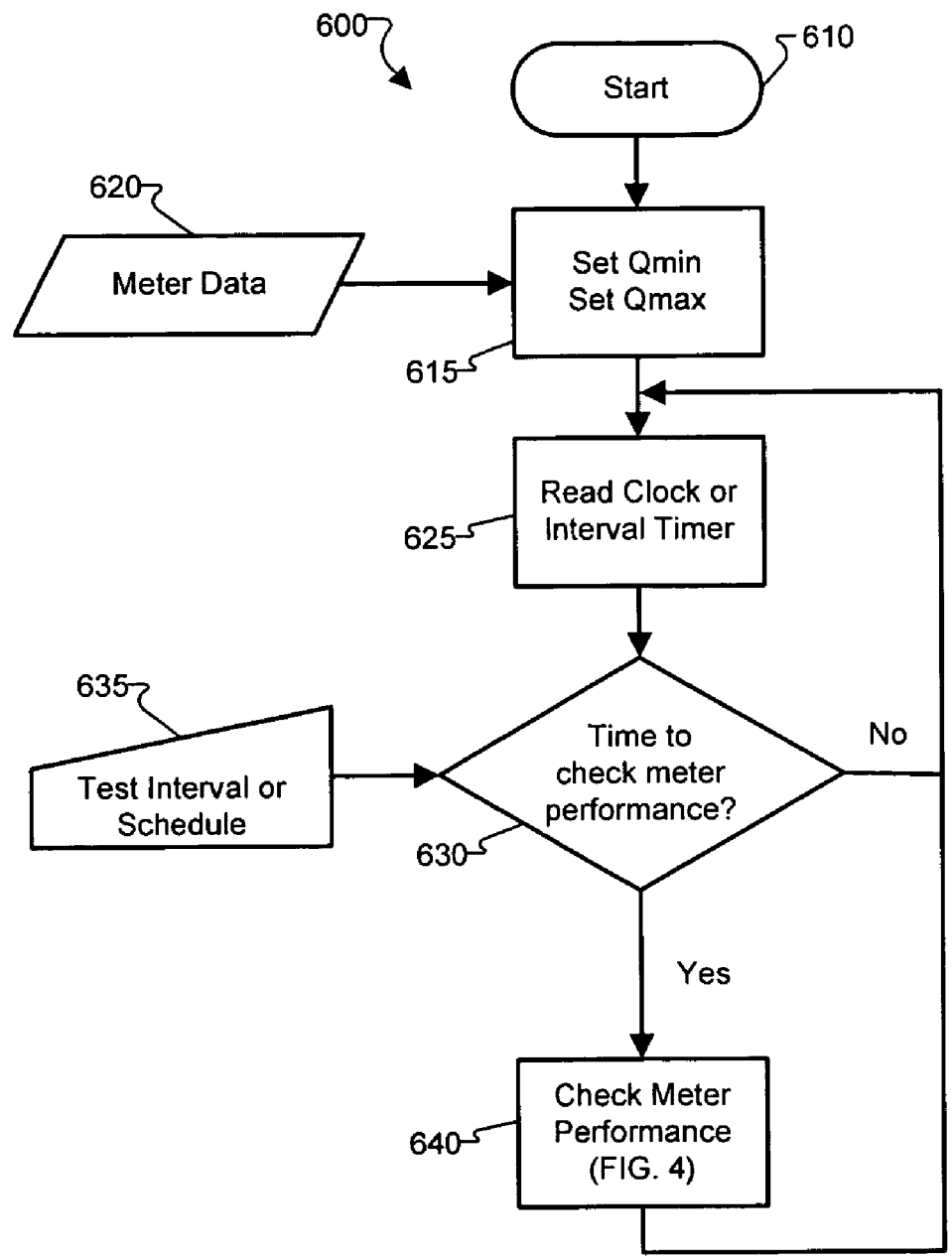
FIG. 6 is a flow diagram of an exemplary continuous meter performance test method.

FIG. 6 shows a flow diagram of an exemplary method 600 for continuous meter performance testing. This method provides for substantially continuous, long term monitoring of a gas meter in a field installation. As such, performance issues that could degrade volume measurement accuracy may be quickly identified and with little or no labor effort.

The method begins at step 610, for example, when called as a subroutine at step 520 in FIG. 5. At step 615, upper and lower limits (Qmax, Qmin) on flow rate are identified based on meter data 620. The meter data 620 may be received from the meter 102 over the link 108, from user input, from stored information in NVM 154, and/or via the COM port 164. The flow rate capacity of the meter 102 and the acceptable range of flow rates on which to measure differential pressure depends on, for example, the characteristics of the meter 102 and the resolution of the system 104. In some embodiments, the valid range of flow rates may be, for example, above about 5%, 10%, 20%, or 30%, and below about 90%, 100%, 110%, 120%, 130%, 140%, or 150% of the rated flow rate capacity of the meter 102.

At step 625, the microprocessor 152 may read the RTC 160 or other timing information source. Using the received time information, in this example, a decision is made at step 630 whether it is time to check the meter based on test schedule or interval information 635, which may be stored in the NVM 154, for example. If the time for the next scheduled meter performance check has not arrived, then step 625 is repeated. If the time for the next scheduled meter performance check has arrived, then the meter performance is checked at step 640, for example, by performing the method 400. After checking the meter performance, step 625 is repeated.

Figure 7:
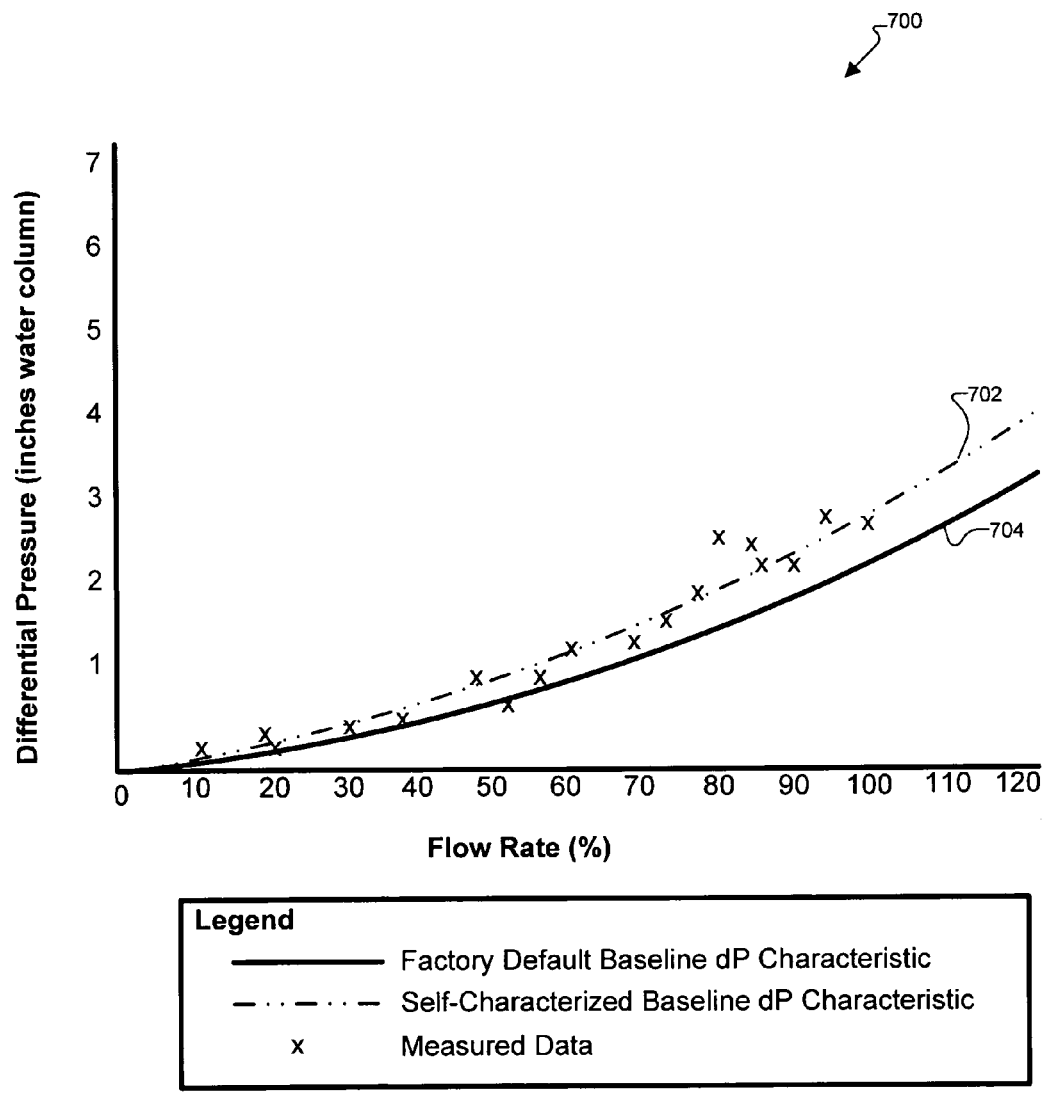
FIG. 7 is a plot to illustrate an exemplary baseline dP characteristic curve determined using a learning method.

FIG. 7 show a plot 700 of an exemplary learned baseline dP characteristic curve 702 that may be determined, for example, using a method to learn a baseline dP characteristic after installing the meter 102 in the field. Examples of learning (e.g., self-characterization) methods that may be performed by the system 104 are described with reference to FIGS. 8A-8B. The plot 700 also shows a factory default baseline dP characteristic curve 704. In some examples, the meter 102 will exhibit a changed baseline dP characteristic after the meter 102 is installed. As such, the learned baseline dP characteristic curve 702 of this example is shifted from the factory default baseline dP curve 704.

The learned baseline dP characteristic curve 702 may be determined, for example, by collecting measured data of dP, Q, LP, and, in some embodiments, LT. Examples of such data collection are described in further detail with reference to FIG. 4. In some embodiments, flow rate measurements (Q) may be corrected for temperature (LT) and/or line pressure (LP) at the time of measurement. In other embodiments, the tables may include uncorrected flow rate Q. However, if the table is based on corrected flow rate, then Q will have to be corrected to properly use the table.

The dP measured values may be stored in a table in the NVM 154, for example. In some embodiments, a curve fit may be applied to the dP and Q data stored in the table. The curve fit may be a linear, polynomial, and/or exponential curve fit, for example. In some embodiments, a regression analysis may be performed to identify a curve that best fits the data. Statistical information, such as confidence and/or variance may be displayed, stored, calculated, or analyzed to determine when a suitable curve has been generated. In some embodiments, statistical metrics that indicate how well the curve fits the measured data may be compared to predetermined thresholds to determine when enough data has been collected such that the learning mode may be ended.

In some embodiments, the self-characterized operating curve 702 may be used, for example, instead of a factory default curve 704 when the self-characterized curve 702 is more appropriate for operation of one particular meter. A self-characterized operating curve may be created during commissioning or after installation, for example. In some embodiments, the rotary flow meter 102 may begin operating using the factory default curve while comparing the operating curve data to the actual operation data of the meter. When enough data is collected to form a self-characterized curve 702, the processor 158 switches the operating curve from the default to the self-characterized curve.

Although a single curve 702 is shown in the plot 700, additional baseline dP characteristic curves may be generated for different conditions of LP. For example a family of characteristic curves may be learned by collecting data and binning the data according to multiple ranges of LP. In some embodiments, for example, three different baseline dP characteristic curves may be generated from measured values at line pressures of between 0 and 15 psi, between 15 and 50 psi, or between 50 and 150 psi, for example. Meters designed to operate at substantially lower or higher pressures may have characteristic curves representing correspondingly lower or higher ranges as appropriate.

FIG. 8A is a flow diagram of an exemplary method to automatically learn the baseline dP characteristic curve 702 of FIG. 7. In some embodiments, the instructions in the learn mode code 156 may cause the processor 152 to perform operations to generate a learned baseline dP characteristic curve, an example of which is the curve 702. Meter performance may be checked by comparing the dP measurements to a threshold above the learned curve. In some embodiments, the threshold may be 50% above the baseline dP curve.

The method begins at step 810 in response to performing step 555 in FIG. 5, for example. At step 812, the microprocessor 152 may read the RTC 160 or other timing information source. Using the received time information, in this example, a decision is made at step 814 whether it is time to check the meter based on test schedule or interval information 816, which may be stored in the NVM 154, for example. If the time for the next scheduled meter performance check has not arrived, then step 812 is repeated. If the time for the next scheduled meter performance check has arrived, then, at step 818, upper and lower limits (Qmax, Qmin) on flow rate are identified for the meter 102. The Qmin and Qmax may be set to accept for collection data in insufficiently filled or vacant positions in a table 820 that will receive the measured data values. If positions are filled sufficiently, then new data for those positions may be ignored, or may displace older or duplicative measurement data. Then, the meter performance is checked at step 830, for example, by performing the method 400. After checking the meter performance, the measurement results are filled into the table at step 832. If the table is not sufficiently full at step 834, then step 812 is repeated.

If the table is sufficiently full at step 834, then the data in the table is checked for reasonableness and/or validity at step 836. Criteria to determine reasonableness and/or validity may include variance from expected values as represented in the factory default curve 205, data points having values that decrease as flow rate increases, or a table of data points that have a greater than allowed standard deviation from a polynomial that represents the characterized curve 210. If the table is full and the data in the table is valid, then the system 104 is set to "Learned baseline dP"=Yes at step 838, and the system 104 exits learn mode at step 840. In this condition, where a learned baseline dP characteristic is available (see step 510), then the learned baseline dP characteristic would be selected at step 515 when performing the method 500.

If the data is not valid at step 836, then an alarm indicator (e.g., message, email, display element, register status flag) is sent at step 842 to indicate failure to generate a baseline dP characteristic curve, and the system 104 exits learn mode at step 840.

FIG. 8B is a flow diagram of an exemplary method to learn the baseline dP characteristic curve of FIG. 7 under operator control. An operator command may include a request to manually set up the differential pressure testing. In one application, the operator may manipulate the flow rate so that data may be collected quickly at a variety of different flow rates. The method begins at step 860 in response to performing step 545 in FIG. 5, for example.

At step 862, the microprocessor 152 may receive a command or other operator control information based on operator input at step 864. Using the received information, in this example, a decision is made at step 862 whether the command has been received, for example. If the command has not been received, then step 862 is repeated. If the command has been received, then, at step 880, the meter performance is checked, for example, by performing the method 400. After checking the meter performance, the measurement results are filled into the table at step 882. If the table is not sufficiently full at step 884, then step 862 is repeated.

If the table is sufficiently full at step 884, then the data in the table is checked for reasonableness and/or validity at step 886 using criteria previously described in step 836. If the table is full and the data in the table is valid, then the system 104 is set to "Learned baseline dP"=Yes at step 888, and the system 104 exits learn mode at step 890. In this condition, where a learned baseline dP characteristic is available (see step 510), then the learned baseline dP characteristic would be selected at step 515 when performing the method 500.

If the data is not valid at step 886, then an alarm indicator (e.g., message, email, display element, register status flag) is sent at step 842 to indicate failure to generate a baseline dP characteristic curve, and the system 104 exits learn mode at step 890.

Although one embodiment of the method has been described, other embodiments may perform the steps in different sequence, or a modified arrangement to achieve the same primary function, which is to monitor performance of a rotary flow meter system.

For example, after one new baseline dP characteristic has been generated, the system 100 may continue to collect flow rate, line temperature, and/or line pressure data to generate additional baseline dP characteristic curves at different values, ranges, and combinations of line temperature and/or line pressure. As such, some embodiments may remain in a learning mode to generate additional baseline dP characteristic curves at for different line pressures and/or temperatures after switching from a factory default baseline dP characteristic to a generated baseline dP characteristic.

In some further embodiments, multiple factory default baseline dP characteristics may be provided for different combinations of line pressure and/or temperature conditions. In such embodiments, the system 100 may select a generated baseline dP characteristic curve if one has been generated for the existing line temperature and line pressure conditions. If a baseline dP characteristic has not been generated for the existing line pressure and/or line temperature conditions, then the system 100 may select the factory default baseline dP characteristic curve as a reference for monitoring the performance of the meter.

In some examples, portions of a baseline dP characteristic curve may be more developed and substantially completed while some ranges (e.g., between 50% and 120% of flow rate capacity) lack sufficient data points to generate a curve. For example, the number of samples and sample point variance may be within predetermined limits over time ranges (e.g., 20% to 50% of flow rate capacity) such that the baseline dP curve is considered to be accurate to a high degree of confidence for at least a portion of the curve. Some embodiments may base the comparison of measured dP using the high confidence portion of a partially generated baseline dP characteristic if the measured flow rate falls within the range of flow rates for which confidence is sufficiently high.

Although an exemplary flow measurement system 100 has been described with reference to FIG. 1, other implementations may be deployed in other remote, automated, and/or field diagnostic metering applications.

In various embodiments, apparatus and associated systems, methods and computer program products may relate to measuring differential pressure (dP) to monitor the performance of a gas meter. An elevated dP may indicate a performance problem, such as contamination or wear of the bearings, that can reduce the gas volume measurement accuracy. If the processing system detects that the dP exceeds a threshold value in some embodiments, then the system may generate a signal to prompt repair or replacement of the meter. The threshold value may be based on a characteristic dP curve, which may be a set of expected dP values at various line pressures and/or temperatures, or one or more polynomials represent the same. In exemplary operating modes, the processing system may use a factory default characteristic dP curve, or a learned dP curve that may be developed in situ using a self-characterization procedure.

In various embodiments, the system 104 may communicate using suitable communication methods, equipment, and techniques. For example, the system 104 may communicate with a portable computer using point-to-point communication in which a message is transported directly from the source to the receiver over a dedicated physical link (e.g. fiber optic link, point-to-point wiring, and daisy-chain). Other embodiments may transport messages by broadcasting to all or substantially all devices that are coupled together by a communication network, for example, by using omni-directional radio frequency (RF) signals, while still other embodiments may transport messages characterized by high directivity, such as RF signals transmitted using directional (i.e., narrow beam) antennas or infrared signals that may operationally be used with focusing optics. Still other embodiments are possible using appropriate interfaces and protocols such as, by way of example and not intended to be limiting, RS-232, RS-422, RS-485, 802.11 a/b/g, Wi-Fi, Ethernet, IrDA, FDDI (fiber distributed data interface), token-ring networks, or multiplexing techniques based on frequency, time, or code divisions. Some implementations may optionally incorporate features such as error checking and correction (ECC) for data integrity, or security measures, such as encryption (e.g., WEP) and password protection.

In some embodiments, each memory may be programmed with the same information and be initialized with substantially identical information stored in non-volatile memory. In other embodiments, one or more systems 104 may be custom configured to perform specific functions. For example, one system 104 may be configured to perform volume correction functions by correcting the meter 102 volume sensor output signals for temperature and pressure.

A number of embodiments of the invention have been described. Nevertheless, it will be understood that various modifications may be made without departing from the spirit and scope of the invention. For example, advantageous results may be achieved if the steps of the disclosed techniques were performed in a different sequence, if components in the disclosed systems were combined in a different manner, or if the components were replaced or supplemented by other components. The functions and processes (including algorithms) may be performed in hardware, software, or a combination thereof. Accordingly, other embodiments are within the scope of the following claims.

What is claimed is:

1. A system for continuously monitoring performance of a fluid flow measurement device, the system comprising:
   a differential pressure (dP) sensor to measure a differential pressure across a gas flow meter of a rotary type, the differential pressure sensor having a first input port to be in continuous uninterruptible fluid communication with an inlet of the gas flow meter and a second input port to be in continuous uninterruptible fluid communication with an outlet of the gas flow meter;

a first plurality of memory locations containing baseline dP characteristic information for the gas flow meter; and a second plurality of memory locations containing instructions that, when executed by a processor, cause the processor to perform operations to:
(a) determine a flow rate of a fluid through the gas flow meter when the differential pressure was measured;
(b) determine whether the measured differential pressure exceeds a threshold differential pressure above the baseline dP characteristic information at the determined flow rate; and
(c) generate an electronic message to communicate a condition of the gas flow meter based upon a result of the operation (b).

2. The system of claim 1, wherein a differential pressure based on the determined flow rate is determined by interpolating a plurality of values associated with the baseline dP characteristic information.

3. The system of claim 1, wherein the baseline dP characteristic information comprises a function to determine differential pressure based on measured flow rate information.

4. The system of claim 3, wherein the baseline dP characteristic information further comprises a function to determine differential pressure based on measured line pressure information.

5. The system of claim 4, wherein the baseline dP characteristic information further comprises a function to determine differential pressure based on measured line temperature information.

6. The system of claim 1, wherein the baseline dP characteristic information is determined during commissioning of the gas flow meter in the field.

7. The system of claim 1, wherein the baseline dP characteristic information is determined before the gas flow meter is installed in the field.

8. The system of claim 1, wherein the baseline dP characteristic information is determined after the gas flow meter is installed, the operations further comprising storing differential pressure measurement information at each of a plurality of measured flow rates to define a second performance characteristic.

9. The system of claim 1, further comprising a first flow restriction element and a second flow restriction element, each flow restriction element to protect the differential pressure sensor against some gas line pressure transients, the first input port to be in continuous uninterruptible fluid communication with the inlet of the gas flow meter through the first flow restriction element and the second input port to be in continuous uninterruptible fluid communication with the outlet of the gas flow meter through the second flow restriction element.

10. The system of claim 1, further comprising a differential pressure limiter to limit the differential pressure between the first and second input ports.

11. The system of claim 1, the operations further comprising determining a volume output signal for the gas flow meter, the volume output signal being corrected to account for at least one of a pressure value and a temperature value.

12. The system of claim 11, further comprising a line pressure sensor to measure a line pressure of a fluid at the inlet or outlet of the gas flow meter.

13. The system of claim 12, wherein the volume output signal is corrected according to the line pressure and a temperature of the fluid.

14. The system of claim 1, further comprising operations to remove a DC offset from the dP sensor during a substantially zero flow rate condition.

15. The system of claim 14, wherein the operation (b) is substantially performed only within limits selected based on a most recent operation to remove the DC offset.

16. The system of claim 15, wherein the selected limits comprise a selected period of time after the most recent operations to remove the DC offset.

* * * * *

UNITED STATES PATENT AND TRADEMARK OFFICE
CERTIFICATE OF CORRECTION

PATENT NO. : 7,295,934 B2
APPLICATION NO. : 11/355148
DATED : November 13, 2007
INVENTOR(S) : Ronald James Hairston It is certified that error appears in the above-identified patent and that said Letters Patent is hereby corrected as shown below:

Col. 2, Line 66, replace "recording" with -- recoding --

Col. 3, Line 6, replace "factor" with -- factory --

Col. 4, Line 61, replace "base" with -- based --

Col. 5, Line 24, replace "portion" with -- port --

Col. 6, Line 15, replace "PX1370" with -- PX 137 0 --

Col. 6, Line 40, replace "on" with -- or --

Col. 6, Line 41, replace "clam" with -- clamp --

Col. 6, Line 44, replace "tranzorbs" with -- transzorbs --

Col. 6, Line 48, after "for example", delete "," and insert -- . --

Col. 7, Line 4, after "In some embodiments", insert -- , --

Col. 8, Line 2, replace "data" with -- date --

Col. 8, Line 15, replace "couple" with -- coupled --

Col. 8, Line 37, replace "12C, SP1" with -- 12C, SP1 --

Col. 8, Line 66, replace "176 in" with -- 176. In --

Col. 8, Line 67, replace "values" with -- valves --

Col. 9, Line 1, replace "values" with -- valves --

Col. 9, Line 2, replace "values" with -- valves --

Col. 9, Line 8, replace "popper" with -- poppet --

Col. 9, Line 10, after "174", insert -- , --

Col. 9, Line 45, replace "includes" with -- include --

Col. 9, line 63, replace "35%. . . . 200%" with -- 35%... 200% --

UNITED STATES PATENT AND TRADEMARK OFFICE
CERTIFICATE OF CORRECTION

PATENT NO.        : 7,295,934 B2
APPLICATION NO. : 11/355148
DATED              : November 13, 2007
INVENTOR(S)      : Ronald James Hairston It is certified that error appears in the above-identified patent and that said Letters Patent is hereby corrected as shown below:

Col. 12, Line 17, replace "causes that" with -- causes the --

Col. 13, Line 27, replace "dp" with -- dP --

Col. 13. Line 28, replace "dp" with -- dP --

Col. 14, Line 27, replace "performing" with -- performance --

Col. 14, Line 29, replace "opening" with -- operating --

Col. 17, Line 55, replace "time" with -- some --

Col. 18, Line 13, replace "represent" with -- representing --

Col. 18, Line 23, after "e.g." insert -- , --

Col. 18, Line 32, replace "operationally" with -- optionally --

Col. 18, Line 38, replace "divisions" with -- division --

Signed and Sealed this

Twenty-fourth Day of June, 2008

JON W. DUDAS
*Director of the United States Patent and Trademark Office*